United States Patent [19]

Langendorf et al.

[11] Patent Number: 5,860,112

[45] Date of Patent: Jan. 12, 1999

[54] METHOD AND APPARATUS FOR BLENDING BUS WRITES AND CACHE WRITE-BACKS TO MEMORY

[75] Inventors: Brian K. Langendorf, El Dorado Hills; Michael Derr, Folsom, both of Calif.

[73] Assignee: Intel Corporation, Santa Clara, Calif.

[21] Appl. No.: 579,116

[22] Filed: Dec. 27, 1995

[51] Int. Cl.$^6$ .................................................. G06F 12/08
[52] U.S. Cl. .......................................... 711/143; 711/146
[58] Field of Search ...................................... 395/470, 473

[56] References Cited

U.S. PATENT DOCUMENTS

| | | | |
|---|---|---|---|
| 5,530,835 | 6/1996 | Vashi et al. | 711/143 |
| 5,553,265 | 9/1996 | Abato et al. | 711/143 |
| 5,572,702 | 11/1996 | Sarangdhar et al. | 711/146 |

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

Apparatus and a method for utilizing a memory bus write buffer to blend up-to-date data stored in a processor cache and being written back to memory with data in the write buffer being written to the same memory address by a bus master in order to maintain data coherency. The circuitry also utilizes the memory bus write buffer to write valid data furnished in a bus master write over up-to-date data in the write buffer being written to the same memory address from a processor cache in order to maintain data coherency. Combining the data from the two sources prior to writing it to memory eliminates at least one write operation by the write controller along with any associated ECC value generation, may eliminate a number of read/modify/write back operations with any associated ECC value generations, and can double the effective depth of the buffer.

12 Claims, 7 Drawing Sheets

Lstrobe(n): asserted when the local bus controller posts write data to the nth buffer entry.

Pstrobe(n): asserted when the processor bus controller posts write back to the nth buffer entry.

Lvalid(n,m): asserted while mth byte of nth buffer entry contains valid write data from local bus for memory.

Lbyte(n,m): asserted when mth byte in current local bus write contains valid data.

Ldata(n,m): Local bus write data for mth byte of nth entry.

Pdata(n,m): Processor write-back for mth byte of nth entry.

Bufdata(n,m): Buffer data for the mth byte of the nth buffer entry.

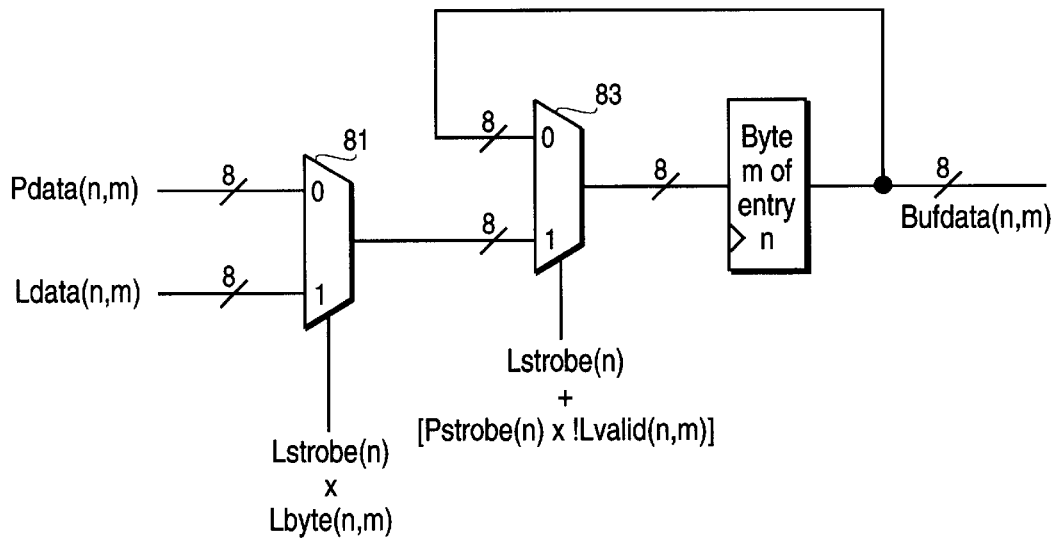

Lstrobe(n): asserted when the local bus controller posts write data to the nth buffer entry.

Pstrobe(n): asserted when the processor bus controller posts write back to the nth buffer entry.

Lvalid(n,m): asserted while mth byte of nth buffer entry contains valid write data from local bus for memory.

Lbyte(n,m): asserted when mth byte in current local bus write contains valid data.

Ldata(n,m): Local bus write data for mth byte of nth entry.

Pdata(n,m): Processor write-back for mth byte of nth entry.

Bufdata(n,m): Buffer data for the mth byte of the nth buffer entry.

FIG. 8

METHOD AND APPARATUS FOR BLENDING BUS WRITES AND CACHE WRITE-BACKS TO MEMORY

BACKGROUND OF THE INVENTION

1. Field of the Invention

This invention relates to personal computer systems and, more particularly, to methods and apparatus for blending write back data from a central processing unit cache with increments of data being written to memory by a bus master in order to maintain data coherency.

2. History of the Prior Art

In order to increase the speed of operation of personal computer systems, the operational speed of central processing units has constantly been increased.

Increasing the processor clock speed is one manner by which the speed of processors is increased. State of the art processors typically run at a faster clock speed than do other components of the computer.

When the clock speed of a central processing unit is increased, the processor conducts its operations more rapidly than do other parts of a personal computer system. For example, a fast central processing unit writes to main memory much more rapidly than main memory can store the data written because memory cannot be accessed constantly at the rate of processor writes. Because of this, many prior art systems utilize write buffers on the memory bus between the central processing unit and main memory. Such a write buffer stores data at the rate at which a processor is writing to main memory while the data is not transferred to main memory until main memory is ready to accept the data. Write buffers are particularly advantageous when used with processors and other circuitry which have been designed to transfer data in bursts. Burst transfers are fast because a processor transfers a number of increments of data to be written on a memory bus or a local bus during a single bus access using only a single set of control signals. Transferring a plurality of increments of data to a write buffer allows the processor to pursue other operations using data and instructions in its caches without having to wait for the slower memory operations to complete. In this manner, the processor may be kept running at higher speeds.

Similar write buffers are now utilized in a number of computer systems for buffering data being transferred to main memory from a bus master positioned on a local bus.

Another manner in which the speed at which processors, and thus computer systems, function is increased is by the use of processor caches. A processor cache stores data and commands which have been recently used by the processor so that this information is more rapidly available to the processor than it is in main memory. In a typical system, when the processor accesses a memory address, the addressed information read from memory is sent both to the processor and to the processor cache; the information sent to the cache often includes additional information surrounding the addressed information sufficient to fill an entire cache line. The information is stored in the cache with its memory address where it is available for later use. A processor cache may be accessed in a fraction of the time required for memory access. Since software processes tend to use the same data and commands repeatedly, the information is much more likely to be accessed in the cache than in memory. The use of processor caches greatly speeds the operation of the processor.

Computer systems utilizing processors such as the i486 and Pentium manufactured by Intel Corporation of Santa Clara, Calif., utilize a relatively small high speed primary cache (called an L1 cache) which is a part of the circuitry of the processor chip and provide control circuitry for joining a larger off-chip secondary cache (called an L2 cache) to assist the primary cache.

One problem systems using processor caches have is in maintaining the coherency of data so that any data used is up to date whether it is accessed from in a cache or in main memory. In systems using processor caches, when a processor writes data to a memory address, that data is immediately sent to the primary processor cache. With processor caches which function on what is termed a "write through" basis, the data sent to the cache is also immediately written back to memory. In this manner, the same data exists in both the cache and main memory; and coherency problems do not arise. However, the need for each write to be transferred immediately to memory places a substantial load on the memory bus (as well as on other parts of the system) and may slow the operation of the system.

When a processor writes data to memory in a system using a cache which functions on what is termed a "write back" basis to maintain coherency of the data in the cache and memory, the data written immediately by the processor to the primary processor cache is written back to memory only when the data is actually needed. For example, a cache may need to write data back to memory only when the cache is flushed, when a valid cache line is deallocated to provide space for a line of new data in the cache, or when the only valid copy of data is in the processor cache and another processor wants to use, or partially overwrite, that data. In each of these cases, the only valid copy of the data may be in the cache so that a write to memory is required to assure that the data in main memory is not stale. Although most computers systems do not include multiple processors, a bus master such as a direct memory access controller (DMA), a SCSI controller, or the like often needs to read data from or write data to main memory. Consequently, computer systems having write back caches also require that data in processor caches be written back to memory before that data may be accessed by these bus master devices. The need to write data back to memory from a processor cache is obvious where a bus master must read from memory since the data it will read may be stale unless up-to-date data in the processor cache in written back to memory before the read operation.

However, when a bus master must write to memory, the processor cache must also write back modified lines to ensure that the latest data is not lost. Since it is possible the bus master to overwrite only a part of the data in a modified cache line while the cache only writes back data in cache line increments, modified data in the cache must be detected and written back to memory before the bus master write to ensure data coherency. A write of cache data which is more up-to-date than main memory data before a bus master write causes an entire cache line of modified data to replace data in memory at those memory locations corresponding to the cache line; and a write of less than a cache line from a bus master to the memory address merely updates the modified data in memory. If the cache write back were not to be performed at this time, the data from the bus master (which is considered to be the most recent) would be written over by a modified cache line and lost.

The need for write backs from the cache during bus master write operations is more obvious when error correction code (ECC) is stored with data in memory. Error correction code is generated as a part of an error correction process and is used to detect storage errors in memory arrays and correct some of those errors. An error correction process uses a math function to compute during storage an error correction code (referred to herein as a check value or ECC value) which is unique to the data stored. A check value is stored in memory in association with the data. When the data is read back, a determination is made whether the data read would produce the check value stored with the data. If the data would not produce the check value stored, some change has occurred in the data or the check value since they were stored. If the value has changed, then the data and the check value read from memory are sometimes used to accomplish the correction of the data depending on the type of error.

An ECC value is computed for an entire bus width increment of data. An ECC value for a sixty-four bit bus width increment of data stored in main memory may be eight bits. Such a value allows detection of all one and two bit errors, the detection of errors in four consecutive bits in certain types of memory, and the correction of all single bit errors. Since an ECC value is computed each time data is written to memory, a write to memory is done in bus width increments. To accomplish a write to memory of data less than the width of the memory bus (e.g., one byte or one word of a double word wide bus), a memory controller typically must read the data at the address in memory, modify the data read from memory with the new data being written, and write the modified data back to memory in a bus width increment. This is a time consuming process.

A bus master on the local bus may write to memory in less than bus length increments. If it does so when using ECC values to protect data in memory, the process is slow compared to writing bus width increments of data. More importantly, if a bus master writes a data increment less than a bus width to memory, then the data in the memory space is read back by the memory controller to complete the write. If the data in memory is stale because the only valid copy is in the processor cache, then the write to memory by the bus master will include stale data. A later write back from the processor cache may or may not update the data correctly. Consequently, the data in memory must be updated by writing back the cache data whenever a controller attempts to access a particular address for which the only valid copy is stored in the processor cache.

Because the ECC value is checked against the data to make sure that what is being read is what was stored, each time data is written to memory in increments less than the memory bus width, the controller must read, modify, and write the modified data back. Moreover, for each read step, the controller must also compare the data read and the check value to see if errors have occurred and then must compute a separate check value for each set of modified data written back to memory. For word increments written on a quad word memory bus, this requires four comparisons and four check value computations for each quad word individually written to memory.

In prior art computer systems, the process of writing back the data from a processor cache in order to update data for a write from a bus master controller and then writing the data furnished over the bus has been conducted in two separate stages. In the first stage, the data is written from the cache into the processor-to-memory write buffer and then to memory. In the second stage, the bus data is written into a bus-to-memory write buffer and then to memory. Two writes to the same location are required which slows the operation of the computer system. If either write requires a read/modify/write operation, the time for accomplishing these steps is even greater.

It is desirable to increase the speed of writing to memory from a bus master in a personal computer system using write buffers and write back caches.

SUMMARY OF THE INVENTION

It is, therefore, an object of the present invention to provide apparatus and a method for increasing the speed at which data is written from a bus-to-memory write buffer to a memory array in a personal computer system utilizing write back processor caches.

This and other objects of the present invention are realized in a personal computer including circuitry for utilizing a memory bus write buffer to blend up-to-date data stored in a processor cache and being written back to memory with data in the write buffer being written to the same memory address by a bus master in order to maintain data coherency. The circuitry also utilizes the memory bus write buffer to write valid data furnished in a bus master write over up-to-date data in the write buffer being written to the same memory address from a processor cache in order to maintain data coherency. Combining the data from the two sources prior to writing it to memory eliminates at least one write operation by the write controller along with any associated ECC value generation, and may eliminate a number of read/modify/write back operations with any associated ECC value generations.

These and other objects and features of the invention will be better understood by reference to the detailed description which follows taken together with the drawings in which like elements are referred to by like designations throughout the several views.

BRIEF DESCRIPTION OF THE DRAWINGS

FIG. 8 is a block diagram illustrating in detail the implementation of an embodiment of the invention illustrated in FIG. 7.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

In this specification, a signal which includes a "#" in its name is considered to be an active low signal. The term "assert" as applied to a signal indicates that signal is active independent of whether the level of the signal is low or high. The term "de-assert" indicates that a signal is inactive.

DETAILED DESCRIPTION

Figure 1:
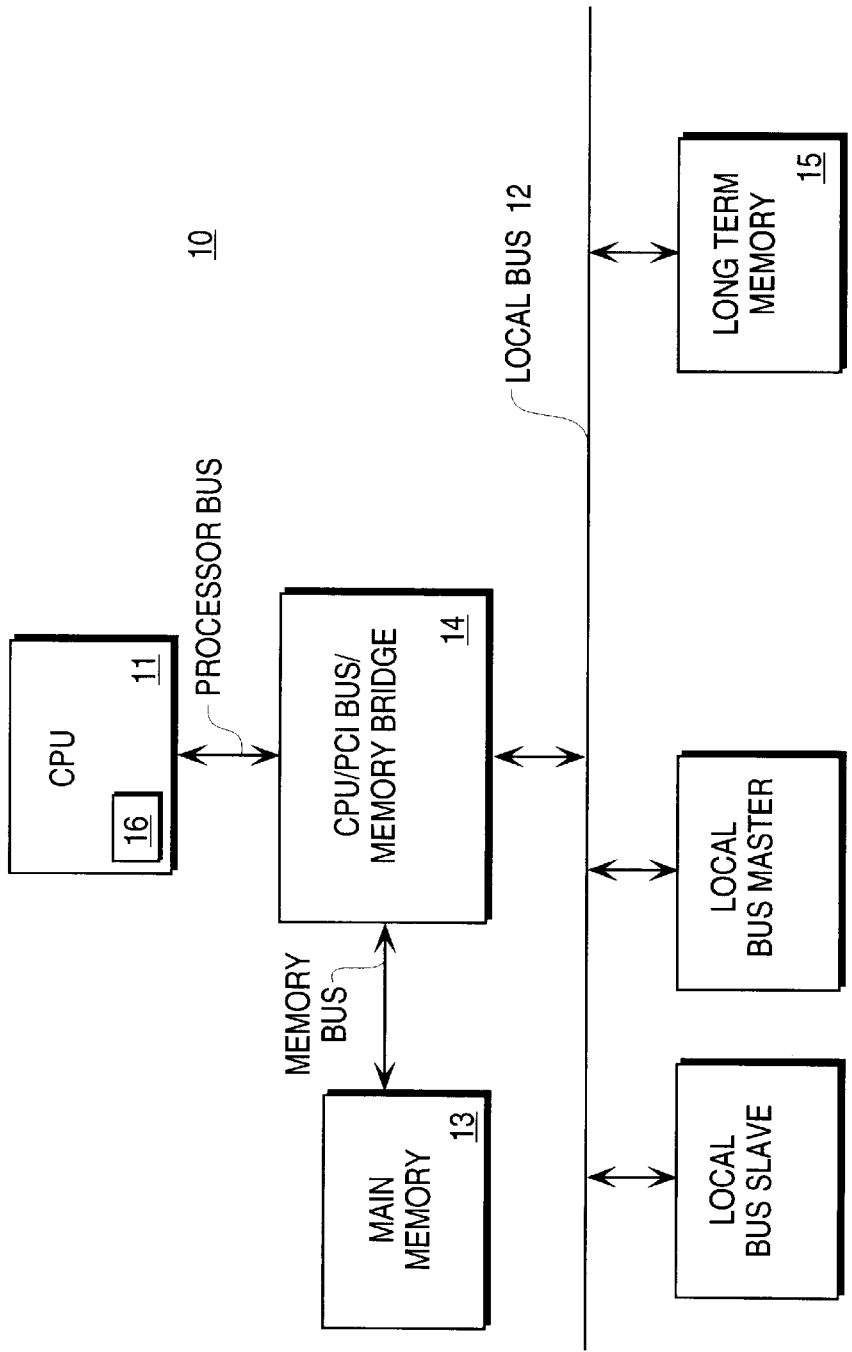
FIG. 1 is a block diagram of a computer system designed in accordance with the present invention.

Referring now to FIG. 1, there is illustrated a computer system 10 configured in accordance with one embodiment of the present invention. The system 10 may be any computer system which functions in the general manner described which is well represented by those systems designed to utilize microprocessors often referred to as of the X86 type designed and manufactured by Intel Corporation of Santa Clara, Calif. The system 10 illustrated includes a central processing unit 11 which executes the various instructions provided to control the operations of the system 10. Central processing units to which this invention pertains typically include cache circuitry 16 designed to perform as an L1 processor cache and to function in a write back mode. The central processing unit 11 is typically joined by a processor bus to a bridge circuit 14 which controls access to a local bus 12 adapted to carry information between the various components of the system 10. In FIG. 1, the bus 12 is preferably a peripheral component interface (PCI) bus or other local bus adapted to provide especially fast transfers of data. In a typical system 10, various input/output devices are connected to the bus 12 as bus master and bus slave circuits. In the present illustration, for example, long term memory 15 may be joined to the PCI bus 12 as a bus slave circuit. Other input/output devices such as sound boards, frame buffers, and the like may also be joined to the bus 12.

The bridge circuit 14 is also joined by a memory bus to main memory 13. Main memory 13 is typically constructed of dynamic random access memory (DRAM) arranged in a manner well known to those skilled in the prior art to store information during a period in which power is provided to the system 10. Depending on the particular configuration, the bridge circuit 14 will typically include a secondary cache controller, a secondary cache (often referred to as a $L_2$ cache), a memory controller, and a number of buffers for storing data during its transfer between the processor, main memory, and the local bus. These components may be an integrated part of the bridge circuit 14 or, alternatively, be joined on a circuit board to the other components.

Figure 2:
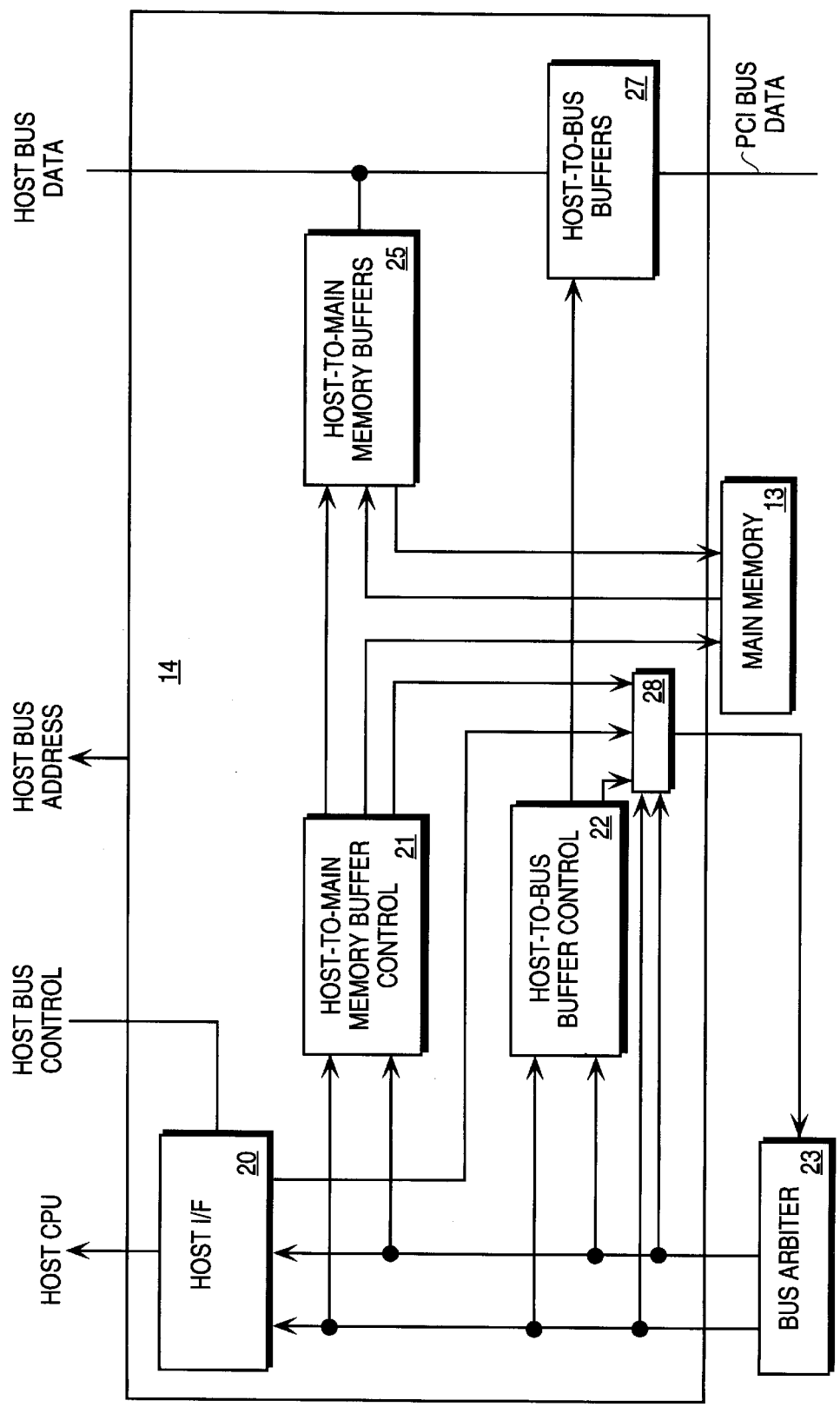
FIG. 2 is a block diagram of a bridge circuit included in the system of FIG. 1 and designed in accordance with the present invention.

FIG. 2 illustrates in more detail the arrangement of major components of the bridge circuit 14 related to the present invention and main memory 13. As may be seen in FIG. 2, the bridge circuit 14 includes a host interface 20 which joins the central processing unit 11 to the bridge circuit. The host interface 20 sends to and receives control signals from the central processing unit; it also sends to and receives control signals from various other components of the bridge circuit 14 including a host-to-main memory buffer control circuit 21 and a host-to-bus buffer control circuit 22. A bus arbiter circuit 23, typically not a part of the bridge circuit 14, controls access to the local bus 12. The host-to-main memory buffer control circuit 21, the host-to-bus buffer control circuit 22, and the bus arbiter circuit 23 all transfer control signals to a circuit 28 which generates control signals back to the bus arbiter circuit 23 to signal the state of operations related to bus access within the bridge circuit 14.

Also a part of the bridge circuit 14 are host-to-main memory buffers 25 and host-to-bus buffers 27. The host-to-main memory buffers 25 and host-to-bus buffers 27 respond to control signals from the host-to-main memory buffer control circuit 21 and the host-to-bus buffer control circuit 22 in carrying out their operations. The host-to-main memory buffers 25 include write buffers for buffering the transfer of write data provided from the central processing unit 11 on a host data bus for transfer on the memory bus to main memory 13. The host-to-bus buffer control circuit 22 includes write buffers for buffering the transfer on the host data bus of write data between the local bus 12 and memory 13.

Figure 3:
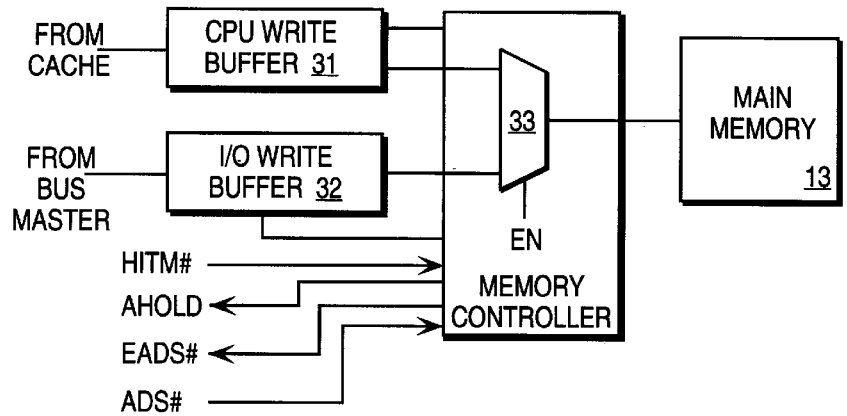
FIG. 3 is a block diagram illustrating a circuit in accordance with the prior art for maintaining the coherency of data in a computer system utilizing a write back processor cache.

FIG. 3 illustrates a circuit 30 in accordance with the prior art for maintaining the coherency of data in a computer system utilizing a write back processor cache. In general, early prior art personal computers utilizing write back arrangements include a write buffer 31 for storing data written on the memory bus from the central processing unit, an input/output write buffer 32 for storing data written to the memory bus from a bus master on the PCI bus, and a multiplexor 33 which is a part of the memory controller and selects data being written back from the processor cache to be written first to memory before data from the bus master.

In this prior art circuit 30, an input/output bus master is allowed to transfer data as far as the input/output write buffers 32. From that point on, it is up to the memory controller to determine whether modified data exists in a processor cache which must be written to memory in order to replace stale data in memory before the bus master access occurs. One problem with this type of arrangement is that it requires a large number of transistors which require a significant amount of die area to implement the two write buffers and gating circuitry.

Figure 4:
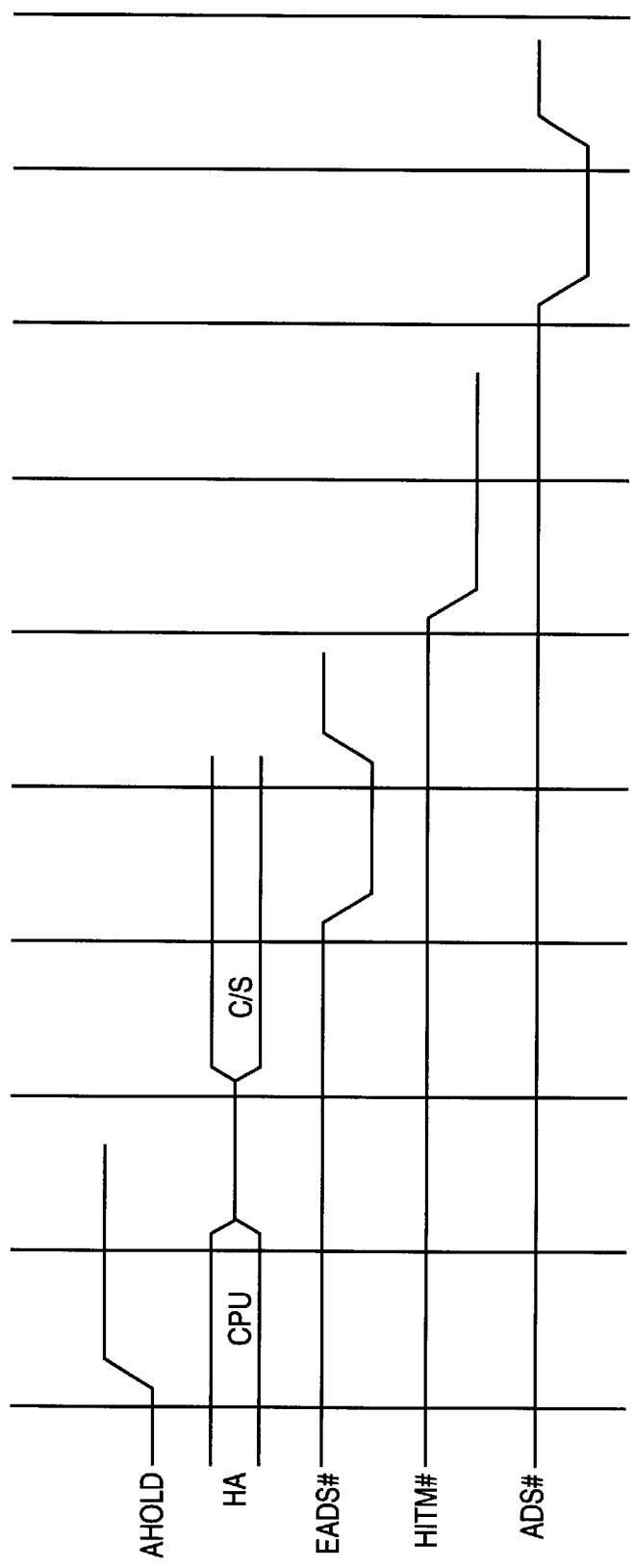
FIG. 4 is a timing diagram illustrating control signals used to determine whether modified data exists in a processor cache in a system in accordance with the present invention.

The timing diagram of FIG. 4 illustrates control signals utilized in the system 10 with prior art arrangements of write buffers to determine the existence of modified data in a processor cache. In order to know when there is modified data in a processor cache, when the memory controller receives a request from a bus master to write to memory, the memory controller asserts a signal (AHOLD in one embodiment) calling for whatever is occurring on the host address bus to halt. If the central processing unit is driving the host bus, it responds to the signal by tristating the bus for one clock to allow the memory controller to gain control of the host address bus. The memory controller asserts an external address strobe signal (EADS# signal in one embodiment) on the host bus and follows with the memory address of the bus master data. In response to the EADS# signal, any processor on the host bus snoops on the bus for the address and checks its processor cache for modified data at the address to which the data is addressed. If modified data exists at that address in the processor cache, the processor asserts a signal indicating a hit of modified data at the address (HITM# signal in one embodiment) so that the memory controller knows there should be a write back cycle. When the memory controller releases the host bus, the processor asserts an address strobe signal (ADS# signal in one embodiment) and writes the modified cache data back on the memory bus. This data reaches the write buffer 31 and is written to main memory by the memory controller before the bus master data in the input/output write buffer 32 is written to memory.

Figure 5:
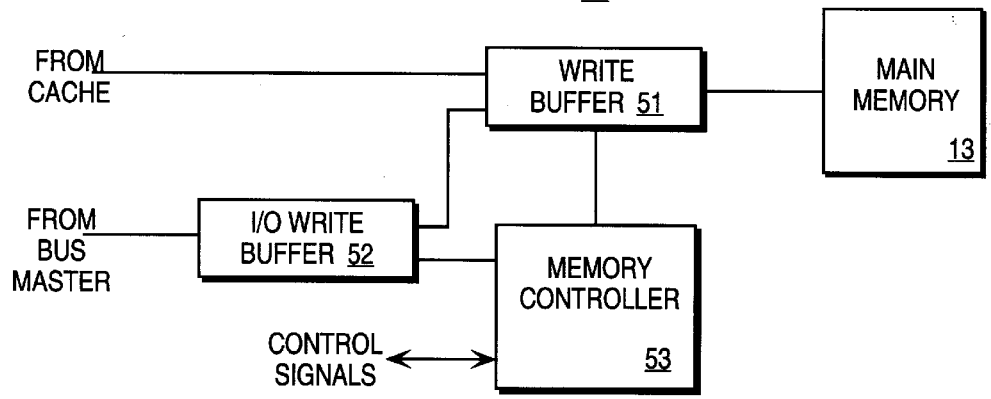
FIG. 5 is another block diagram illustrating a second circuit in accordance with the prior art for maintaining the coherency of data in a computer system utilizing a write back processor cache.

Later versions of prior art personal computers utilizing write back arrangements such as that shown in FIG. 5 include a input/output write buffer 52 for data to be written on the memory bus from a bus master on the PCI bus, a write buffer 51 for receiving data to be written on the memory bus from either the processor cache or the input/output write buffer 52, and memory control circuitry 53 for assuring that the write to the write buffer 51 from the processor cache occurs before a write from the buffer 52 when a cache write back is necessary. This circuitry carries out essentially the same process as that described above with regard to the circuit of FIG. 3.

With either of these prior art arrangements, the write buffers utilized for transferring data from the central processing unit and its processor cache are on a separate chip from the chip which includes the write buffers utilized for transferring data from the I/O bus master. This has the disadvantage of requiring that pins be allotted to furnishing the various control signals used for ascertaining whether modified data exists in a cache so that a write back is required before I/O data may be written to memory. Moreover, the need to transfer the control signals over chip boundaries using either of these prior art arrangements may delay the receipt of a positive signal indicating that modified data exists in the processor cache.

In any case, at least two writes to memory are required even where each write from a write buffer (either processor or I/O) is of a full bus width of data and the generation of an ECC value is required. Moreover, if the I/O bus master writes are less than a full bus width, then a full bus width write of data from the processor cache is followed by a partial bus width write of data from the I/O write buffer requiring a read/modify/write operation including a read of the ECC value stored and the generation of a new ECC value.

Figure 6:
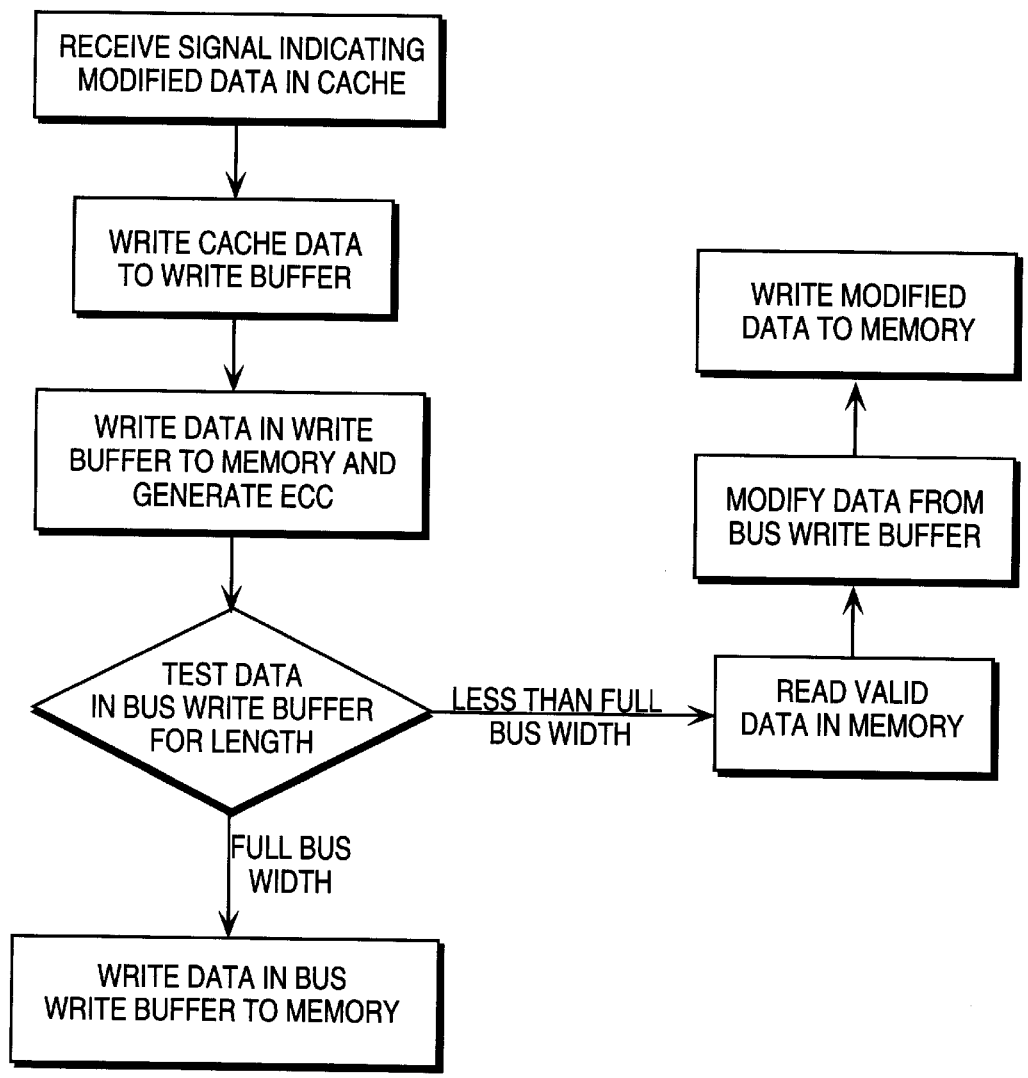
FIG. 6 is a flow chart of the steps required to write back data from a processor cache to allow a bus master write to occur using the prior art implementations shown in FIGS. 3 and 5.

Thus the steps shown in FIG. 6 are those which must occur in these prior art circuits in order to write valid data to main memory from either a processor or an I/O bus master where the data written is less than a bus width. Assuming that no delay is required for the memory controller to determine that a write back of cache data is required, the data in buffer 51 of FIG. 5 must be written to memory and an ECC value must be generated for that full bus width of data. Next, the data in the input/output write buffer 52 must be written to memory through the buffer 51; and an ECC value must be generated even if that write includes a full bus width of data. Thus, even with full bus widths in both buffers the operation requires four individual steps. If the data in the input/output write buffer 52 which must be written to memory is less than a full bus width, however, a read of the data in memory at that address along with a comparison of ECC value with the data read, a modification of the data from the write buffer 52 by the data from memory, and a write back of modified data must occur. The write back again includes generation of an ECC value if error correction is involved. As will be seen, this is a long process.

Figure 7:
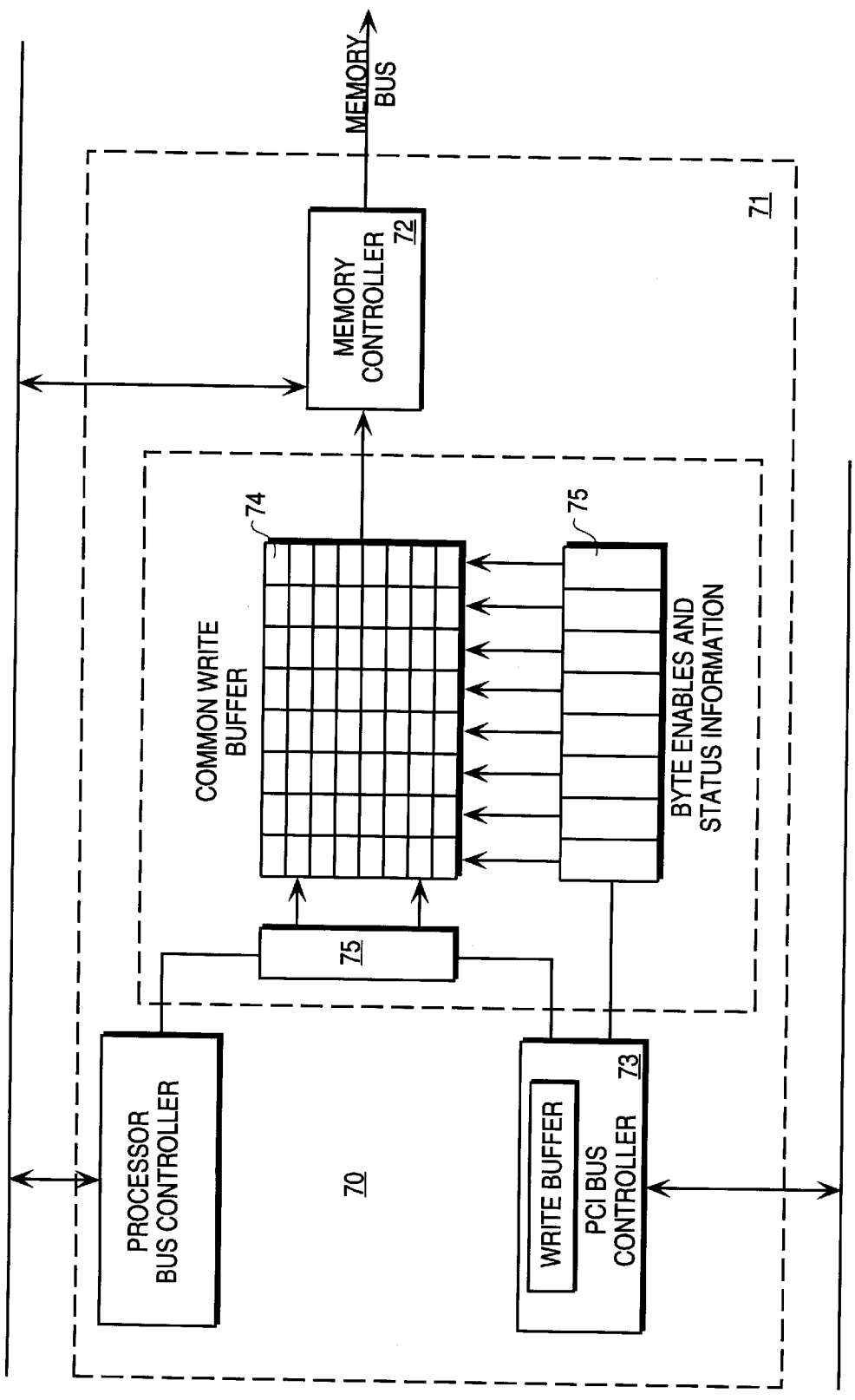
FIG. 7 is a block diagram illustrating the implementation of one embodiment of the invention to write back processor cache data to allow a bus master write to occur.

FIG. 7 illustrates a circuit 70 in accordance with the present invention. This circuit 70 utilizes a new bridge chip 71 to control the flow of data between the central processing unit, main memory, and the PCI bus. Within the chip 71 are a memory controller 72, a PCI bus controller 73 including a write buffer for storing data from a bus master on the PCI bus, and a common write buffer 74 receiving data from either the bus master write buffer of the controller 73 or the central processing unit. Since this circuitry is all on the same chip, external pin connections are not necessary to provide data sufficient to control the operation of filling the common write buffer 74. Consequently, there are insignificant delays in determining whether modified data exists in the processor cache when the process using the control signals illustrated in FIG. 4 is practiced.

Control of the common write buffer 74 is exerted by a control portion 75 of the buffer 74 to allow either data from the processor cache or from the bus master write buffer of the controller 73 to be transferred first to the common write buffer 74. When a write back of cache data is required (determined through the steps outlined above which produce a HITM# signal) and processor cache data has been transferred to the write buffer 74 before the arrival of data from the bus master, the buffer control circuitry 75 then writes the valid increments of bus master data from the write buffer of the controller 73 addressed to the same address over the processor cache data into the buffer 74 so that a merger of valid data occurs in the buffer 74. Since a write from the processor cache is typically only of full cache lines, all of the merged data is valid; and only one full bus width write to memory will be required. This substantially accelerates the process necessary for I/O writes in systems with write back processor caches.

If, on the other hand, the data in the bus master write buffer of the controller 73 is sent first to the common write buffer 74 and it is then determined that a write back of cache data is required, the buffer control circuitry 75 writes valid processor cache data to the common write buffer 74 but only to bytes of the entry at that address which do not already store valid data from the bus master so that a blending of valid data from the processor cache and the bus master takes place and all bytes of the data which are to be written to memory are valid. Those bytes containing valid data are determined from byte enable and status information provided by the bus controller 73. In one embodiment, the status information includes a separate bit for each byte of the particular entry; a status bit in one condition indicates a valid byte while a status bit in a second condition indicates stale data. As with the process when the processor cache writes first to the buffer 74, the process in which the bus master data is written first to the buffer 74 also requires only one full bus width write to memory and substantially accelerates the process necessary for bus master writes in systems with write back processor caches. The same system could, of course, be used with modification which will be obvious to those skilled in the art to allow the same result in a system using multiple processors.

FIG. 8 illustrates in detail one embodiment of a common write buffer such as the buffer 74 illustrated in FIG. 7 which may be used in implementing the present invention. In a system with a quad word memory bus, the write buffer 74 may include a plurality of individual storage areas (typically hardware registers) for entries. Each storage area is capable of storing an increment of data of a size (eight bytes) up to the bus width. A particular buffer 74 in one embodiment includes space for eight such quad word entries so that two entire cache lines of data each having thirty-two bytes may be stored in the buffer 74 at once. Other write buffers may embody a lesser or greater number of individual storage areas each capable of storing more or less write data. The embodiment illustrated in FIG. 8 includes circuitry for controlling the writing of data to a single byte of a single register entry in the write buffer 74 of FIG. 7. This circuitry is duplicated to provide for writing to the other bytes of each entry and to each entry of the buffer 74.

In order to allow data from either the processor cache or the PCI bus to be stored in the common buffer 74, data (Pdata) from the cache and data (Ldata) from the local bus are each furnished to the input terminals of a multiplexor 81. If both a strobe signal (Lstrobe) for writing data to that entry of the buffer 74 from the local bus and a byte of valid data (Lbyte(n,m)) exists in the current write to that byte of that entry, then the data (Ldata) from the local bus write is transferred by the multiplexor 81. If one or both is not present, then the data (Pdata) from the processor cache is transferred by the multiplexor 81.

The output of the multiplexor 81 is transferred to one input terminal of a second multiplexor 83. The multiplexor 83 also receives as input a present value held in the byte of the entry to which the data is being written. If either (1) a strobe signal (Lstrobe) for writing data to that entry of the buffer 74 from the local bus, or (2) a strobe signal (Pstrobe) for writing data to that entry of the buffer 74 from the processor cache and a signal indicating that valid data (Ldata) from the local bus presently residing in that byte of the buffer is deasserted, then the data transferred from the multiplexor 81 is written to the buffer 74.

Consequently, if new valid data from the local bus is being transferred by the multiplexor 81 to that byte of the buffer 74, the multiplexor 83 transferred that data to the buffer 74 and it overwrites data in the buffer. If new valid data from the processor cache is being transferred by the multiplexor 81 to that byte of the buffer 74 and the data in that byte of the buffer 74 is not valid local bus data, the data transferred by the multiplexor 81 overwrites whatever is in that byte of the buffer 74. On the other hand, if new valid data from the processor cache is being transferred by the multiplexor 81 to that byte of the buffer 74 and local bus data in that byte of the buffer 74 is valid, the data in the buffer 74 is recirculated by the multiplexor 83. If neither new valid local bus data nor valid processor cache data is being transferred by the multiplexor 81, the data in that byte of the buffer 74 recirculates.

Consequently, no byte of valid local bus data in the buffer 74 is ever overwritten by data from the processor cache while valid data from the local bus may overwrite a byte of valid data in the buffer 74 from the processor cache. Moreover, either processor cache data or local bus data may be written to a byte of the buffer 74 in which no valid local bus data is stored. Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for combining and storing data comprising the steps of:

selecting data provided to a first circuit by a cache and a bus master, writing data selected from the cache from a second circuit to at least one of a plurality of buffer entries of a common write buffer at which no valid data from the bus master is stored, wherein the second circuit comprises a second multiplexer having inputs coupled to select valid data provided by either the cache or the bus master or to select data presently stored in the at least one buffer entry, and writing data selected from the second circuit to the at least one of a plurality of buffer entries of the common write buffer.

2. A method for combining and storing data as claimed in claim 1, wherein each buffer entry may be written to in an increment that is less than a data storage capacity of the buffer entry.

3. A buffer for combining data comprising:

a plurality of buffer entries, wherein each buffer entry may be written to in an increment that is less than a data storage capacity of each buffer entry;

a local bus write buffer that stores data from a local bus master;

a first circuit that selects data items provided by a cache and a bus master; and a second circuit that writes a first selected data item from the cache to at least one available increment of a buffer entry, a second selected data item from the bus master being written to at least one increment of the buffer entry containing data from the cache, wherein the second circuit comprises a second multiplexer having inputs coupled to select valid data provided by either the cache or the bus master or to select data presently stored in the buffer entry.

4. The buffer of claim 3 wherein a least increment comprises less than half of the data storage capacity.

5. The write buffer of claim 3 wherein the first circuit comprises a first multiplexer having inputs coupled to select data from either the cache or the bus master.

6. A circuit for combining and storing data comprising:

a local bus write buffer that stores data from a local bus master, a common write buffer having a plurality of buffer entries wherein each buffer entry may be written to in an increment that is less than a data storage capacity of each buffer entry, a first circuit that selects data items from either a cache or a local bus write buffer for writing to the common write buffer, and a second circuit that writes a first valid data item selected from the cache to a buffer entry of the common write buffer at positions at which no valid data from a bus master is stored, the second circuit writing a second valid data item selected from the local bus write buffer to positions in the buffer entry, wherein the second circuit comprises a second multiplexer having inputs coupled to select valid data provided by either the cache or the bus master or to select data presently stored in a common write buffer entry.

7. A circuit as claimed in claim 6 in which the plurality of buffer entries is sufficient to store data from a plurality of cache lines in a processor write back cache or data from a plurality of local bus width writes by a bus master.

8. A circuit as claimed in claim 6 in which the first circuit comprises a first multiplexer coupled to receive input data from a processor write back cache and a local bus write buffer, the first multiplexer responding to control signals that control the transfer of valid input data from the processor write back cache and from the bus master.

9. A circuit as claimed in claim 6, wherein the second multiplexer is responsive to control signals to transfer valid input data from a processor write back cache to positions of a buffer entry at which no valid data from a local bus write buffer is stored, the second multiplexer responsive to control signals to transfer valid input data selected by the first circuit from a local bus write buffer to any position of the buffer entry.

10. A circuit as claimed in claim 6 in which:
the first circuit comprises a first multiplexer coupled to receive input data from a processor write back cache and a local bus write buffer, the first multiplexer responsive to control signals to transfer valid input data from a processor write back cache and from a local bus write buffer; and
the second multiplexer responsive to control signals to transfer valid input data from a processor write back cache to positions of a buffer entry at which no valid data from a local bus write buffer is stored, the second multiplexer responsive to control signals to transfer valid input data selected by the first circuit from a local bus write buffer to any position of the buffer entry.

11. A computer system comprising a bridge circuit coupled among a central processing unit (CPU) and a memory and a bus, the bridge circuit comprising:
a local bus write buffer that stores data from a bus master,
a common write buffer having a plurality of buffer entries wherein each buffer entry may be written to in an increment that is less than a data storage capacity of each buffer entry,
a first circuit that selects data items from a processor and a local bus write buffer for writing to the common write buffer, and
a second circuit that writes a first valid data item selected from the processor to the common write buffer at positions at which no valid data from the local bus write buffer is stored, the second circuit writing a second valid data item selected from the local bus write buffer to any position of the common write buffer, wherein the second circuit comprises a second multiplexor having inputs coupled to select valid data provided by either the processor or the bus master or to select data presently stored in a common write buffer entry.

12. A computer system as claimed in claim 11 in which:
the first circuit comprises a first multiplexer receiving input data from a write back cache of the CPU and the local bus write buffer, the first multiplexer responding to control signals to transfer valid input data from the write back cache and the local bus write buffer; and
the second multiplexer responds to control signals to transfer valid input data from the processor to positions of a buffer entry at which no valid data from the local bus write buffer is stored, and the second multiplexer responding to control signals to transfer valid input data selected by the first circuit from the local bus write buffer to any position of the buffer entry.

* * * * *

UNITED STATES PATENT AND TRADEMARK OFFICE
CERTIFICATE OF CORRECTION

PATENT NO. : 5,860,112
DATED : January 12, 1999
INVENTOR(S) : Langendorf et al.

It is certified that error appears in the above-identified patent and that said Letters Patent is hereby corrected as shown below:

Column 9,
Line 42, delete "in" and insert -- is --.

Signed and Sealed this

Fifteenth Day of July, 2003

JAMES E. ROGAN
*Director of the United States Patent and Trademark Office*